United States Patent Office 3,775,378
Patented Nov. 27, 1973

3,775,378
CHEMICAL BINDING OF AN AMINO ACID TO A CHLOROSULFONATED POLYMER CARRIER
Johannes J. Dahlmans, Maastricht, and Pieter L. Kerkhoffs, Geleen, Netherlands, assignors to Stamicarbon N.V., Heerlen, Netherlands
No Drawing. Filed Oct. 21, 1970, Ser. No. 82,831
Claims priority, application Netherlands, Oct. 25, 1969, 6916122
Int. Cl. C08g 20/08
U.S. Cl. 260—78 A
7 Claims

ABSTRACT OF THE DISCLOSURE

A process for chemically bonding an amino acid or an amino acid derivative to a chlorosulfonated polymer by reacting the free amino group with a chlorosulfonic acid group on the polymer. Additional amino acid groups can then be reacted with the carboxyl groups of the bonded amino group to form peptides and poly-peptides.

---

This invention relates to a process for the chemical binding of an amino acid, or of an amino acid derivative, to a polymer carrier. Such a process is, for instance, of importance for the synthesis of peptides according to the solid-phase method, also called the Merrifield method, which has been described in various publications (see, for instance, Recent Progress in Hormone Research 23 (1967), pages 454–465). In the preparation of peptides such as by the Merrifield method, the carboxyl group of an amino acid, which corresponds to the end carboxyl group in the peptide to be prepared, is chemically bound to a polymer carrier. The peptide is then formed by stepwise addition of subsequent amino acids to the amino group of the acids or partial peptide chain bound to the polymer carrier. The amino groups of the amino acid are reacted and bound to a protective group which prevents the amino groups of the adding-on amino acids from entering into the reaction during the initial bonding of their carboxyl groups to the amino group of the polymer-bound amino acid in the stepwise chain-extending reaction.

The stepwise chain-extending reaction then continues with first removing the protective group from the last-added-on amino acid bound to the carrier, and second, coupling resulting free amino group to the free carboxyl group of another to-be-added-on amino acid. The last-mentioned added-on amino acid group similarly contains an amino-protective group, and after peptide coupling this protective group is removed, and the resulting partial poly-peptide is formed while still bound to the solid carrier.

Subsequent amino acids are then similarly coupled to the free amino group of the growing peptide chain, with a gradual formation of the desired amino acid chain.

After the amino acid chain has developed its desired length, the chain is separated from the polymer carrier, and the desired peptide obtained as such.

The polymer carriers used in the processes exemplified by the Merrifield method are polymers which contain methyl chloride groups capable of forming a bond with the carboxyl group of the amino acid. One of the advantages of the solid-phase peptide synthesis, such as the Merrifield method, is that the solvent-insoluble product obtained after the coupling of each amino acid can be separated, by filtration, from the reactants and the by-products.

However, this aforesaid method has the distinct disadvantage that at most only some 20% of the methyl and chloride groups of the carrier polymer are able to initiate the coupling reaction with the first amino acid, and during the subsequent formation of the amino acid chain, the reacting amino acid carboxyl groups not only couple to the desired amino acid chain, but also couple to the, as yet unreacted, methylene chloride groups. A further disadvantage is that during the coupling of the first amino acid to the solid carrier, which takes place at a temperature of approximately 80° C., racemization of the amino acid may occur.

According to the present invention, peptides can be synthesized by a solid-phase method which avoids the disadvantages mentioned above with processes of the Merrifield type. It has now been found that the peptide chains can instead be more readily produced by first reacting the amino group of an amino acid with a polymer carrier containing chlorosulfonic acid groups. The carboxyl end group of the amino acid bound to the polymer carrier then reacts with the amino group of another amino acid group, forming a peptide bond. The amino acid chain can subsequently similarly add on further amino acids until a chain of desired length is formed.

In the process of this invention, the coupling of the amino groups to the chlorosulfonic acid groups is virtually quantitative, and this coupling can be carried out at a low temperature whereat no, or practically no, racemization of the amino acid will occur. The coupling reaction results in the liberation of hydrogen chloride, and the coupling is achieved between the nitrogen atom of the amino group and the sulphur atom of the sulfonic acid group.

Coupling of the amino acid to a carrier by way of the amino group rather than through the carboxyl is known per se (see, for instance, Journal of American Chemical Society 85 (1963), page 3045); however, the known process involves the coupling of the amino group to an oxycarbonyl group which is attached to the carrier rather than to a sulfonic acid chloride group as taught by the present invention. The process utilizing oxycarbonyl groups has the distinct disadvantage that during the subsequent chain lengthening steps, where further amino acids are coupled to the growing chain, either racemization of the amino acids or disrupting of the binding with the carrier generally occurs. It has now been unexpectedly found that coupling with a polymer carrier containing chlorosulfonic acid chloride groups avoids this disadvantage and makes it possible to couple subsequent amino acids to the growing chain without disrupting the bond to the polymer carrier and without racemization of the amino acids.

The invention, therefore, represents an improved process for the preparation of peptide chains wherein the chemical binding of an amino acid, or an amino acid derivative, to a polymer carrier by reaction of the free amino group of the amino acid compound with a reactive chlorosulfonic acid group on the polymer carrier.

According to the present invention those amino acids capable of forming peptides, and which are well-known in the art, can be excellently coupled to the polymer carrier, also including those amino acids which are sterically hindered such as valine. The sterically hindered amino acids can generally be coupled to a carrier only with difficulty according to known processes. However, they can be coupled very well to the relevant carrier according to the present invention.

Various particulate, finely divided polymer carriers having a particle size in the range of 40–80 microns and containing reactive chlorosulfonic acid groups can be utilized. Preferably, a polystyrene polymer copolymerized with divinyl benzene containing reactive chlorosulfonic acid groups distributed along the polymer chain is employed as polymer carrier. However, other polymers which can be used are chlorosulfonated polystyrene and chlorosulfonated phenolic resins.

The polymer carriers may be prepared in a manner similar to the chlorosulfonation of alkylated benzenes (see Journal of American Chemical Society (1940) page 511). The chlorosulfonic acid in the desired quantity is allowed to react with the polymer in swollen condition. The chlorosulfonic acid quantity in the carrier may be varied. Very suitable results are obtained by using 1-3 millimoles of chlorosulfonic acid per gram of carrier on a basis of the total weight of the carrier.

The process according to the invention may be carried out by allowing the polymer carrier to swell, at room temperature, in a mixture of water and dioxane, and subsequently adding the amino compound at a constant pH within the range of about 8 to about 10, and in a quantity referred in excess to the molar equivalents of chlorosulfonic acid contained in the carrier. The mixture is stirred at room temperature for a period of 12-24 hours and the solid phase, containing the polymer carrier with amino acid groups bonded thereto is removed by filtration.

For the preparation of peptides according to the process covered by the invention, the amino acid chain can be obtained by a step-by-step formation. The polymer carrier containing the amino groups is reacted with further amino acids until the desired chain length is obtained. The formation of the amino acid chain can also be commenced by coupling a peptide, for instance a dipeptide, to the carrier and completing the desired amino acid chain with further addition of amino acids and/or peptides.

After the desired amino acid chain has been obtained, the bond holding the chain to the polymer carrier can be disrupted by several well-known methods, preferably with the aid of a reducing agent such as phosphonium iodide or sodium in liquid ammonia. If necessary, the remaining polymer can then be regenerated and used again.

The process according to the invention will be further described in more detail in the following examples without the invention being restricted to these examples.

The polymer carrier used in the following examples was prepared by stirring commercial styrene/divinylbenzene polymer beads (Bio Beads X-2 from Bio-Rand-Lab) first with chlorosulfonic acid in tetrachloromethane at 0° C. and then with thionylchloride in dimethylformamide at 30° C. and then washed with an organic solvent.

EXAMPLE I

A polymer carrier (5 grams, particle size 40 to 80 microns), dioxane (70 ml.), water (30 ml.) and tertiary butyl ester of L-leucine (2.5 grams) are transferred to a half-liter flask which is equipped with a stirrer. The polymer carrier is polystyrene coupled with 2% by weight of divinyl benzene, and containing 1.32 millimoles of chlorosulfonic acid per gram of copolymerizate. The mixture is stirred for 15 hours at room temperature while the pH is kept at a value of about 9.5 by addition of dilute sodium hydroxide as needed. Next, the solid matter is filtered off and washed. Washing is carried out successively 3 times with a mixture of water and dioxane, twice with dioxane and twice with methanol. The washed product is dried in vacuum (5.6 grams of product were obtained). A nitrogen analysis (1.44% of N by w.) indicated that tertiary butyl ester of L-leucine was present in an amount analysis (3.4% of S by w.) of the product obtained with respect to the original polymer carrier indicated that 97% of the sulfonic acid present bond to amino groups.

EXAMPLE II

A polymer carrier (5 grams of the type mentioned in Example I), tetrahydrofurane (100 ml.), water (50 ml.) and tertiary butyl ester of L-phenylalanine (3 grams) are transferred to a half-liter flask which is equipped with a stirrer. The mixture is stirred for 24 hours at room temperature, while the pH is kept at 8.5. The solid matter is then filtered off and washed successively one time with a mixture of water and tetrahydrofurane and three times with tetrahydrofurane. After the drying, 5.8 grams of product remained, containing 1.3% of nitrogen by weight and 3.1% of sulphur by weight. Thus, 96% of the sulfonic acid present was bound to amino groups.

EXAMPLE III

A polymer carrier of the type mentioned in Example I (15 grams), dioxane (120 ml.), water (40 ml.) and L-valine tertiary butyl ester (9.5 grams) are transferred to a half-liter flask which is equipped with a stirrer. The polymer carrier used is of the same type as the one employed in Example I, but now with 1.74 millimoles of chlorosulfonic acid per gram. The mixture is stirred for 18 hours at a temperature of about 0° C., while the pH is kept at 9.0 by adding dilute lye as needed. Next, the solid matter is filtered off and, successively, washed twice with a mixture of dioxane and water and three times with dioxane. The solid matter is subsequently washed with dioxane-hexane mixtures, the dioxane quantity in the mixtures being gradually reduced. Finally, the product is washed with hexane and dried in vacuum. The product obtained (18 grams) contained 2.0% of nitrogen and 4.7% of sulphur. Thus 98% of the sulfonic acid present were bound to amino groups.

EXAMPLE IV

The product obtained in Example III (18 grams) was stirred in tri-fluoro acetic acid at room temperature to free the valine-carboxyl group. The material was then washed and stirred for 12 hours at room temperature with 11.5 grams of L-phenylalanine-tert-butylester and 7.5 grams of dicyclohexylcarbodiimide in 170 ml. of dioxane. Next the material was filtered and washed thoroughly with water and dioxane. Part of the material was then coupled in subsequent steps with L-leucine tert butylester, L-alanine tert butylester, L-proline tert butyl ester in the above described manner. Ultimately a pentapeptide val-pheleu-ala-pro is obtained which is bound to the polymer carrier through the amino group of valine.

Element analysis of the carrier polymer, the polymer dipeptide and the polymer pentapeptide gave the following results, showing that the amino acid coupling steps all proceed with high efficiency.

TABLE

|  | Mg. eq. S per g. | | Mg. eq. N per g. | |
| --- | --- | --- | --- | --- |
|  | Found | Calculated | Found | Calculated |
| Carrier | 1.74 | | | |
| Carrier-dipeptide | 1.12 | 1.24 | 2.28 | 2.49 |
| Carrier pentapeptide | 0.84 | 0.94 | 4.15 | 4.47 |

The pentapeptide was next disconnected from the polymer carrier by stirring the material with phosphonium iodide in glacial acetic acid at 50° C. for 6 hours. Racemization was not measurable to any degree.

What is claimed is:
1. In a process for the chemical binding of an amino acid compound having a free amino group, said compound selected from the group consisting of amino acids, substituted amino acids and peptides, to a polymer carrier containing reactive groups thereon, said process comprising reacting the amino acid compound with said reactive groups on said polymer, the improvement comprising using, as the polymer carrier, a chlorosulfonated polymer selected from the group consisting of chlorosulfonated polystyrene, chlorosulfonated polystyrene copolymers, and chlorosulfonated phenolic resins, and reacting said amino acid compound in an amount in excess of the molar equivalent, based on the amount of chlorosulfonic acid groups, at a pH of about 8 to about 10, with the chlorosulfonic acid groups, whereby the coupling of the amino acid groups to the chlorosulfonic acid groups is virtually quantitative and racemization of the amino acid component is reduced.

2. Process according to claim 1, wherein said derivatives are amino acid esters.

3. Process according to claim 2, wherein the polymer contains 1–3 millimoles of chlorosulfonic acid groups per gram of total weight of the polymer.

4. Process according to claim 1, wherein said polymer is a chlorosulfonic styrene-divinyl benzene copolymer.

5. Process according to claim 1, wherein said polymers have a particle size of about 40 to about 80 microns.

6. Process according to claim 1, wherein the polymer contains about 1–3 millimoles of chlorosulfonic acid groups per gram of total weight of the polymer.

7. Process according to claim 6, wherein the polymer is a chlorosulfonated styrene-divinyl benzene copolymer.

References Cited

Advances in Enzymology, 32, pp. 221–233, 1969.

HOWARD E. SCHAIN, Primary Examiner

U.S. Cl. X.R.

260—49, 112.5